United States Patent
Kim et al.

(10) Patent No.: US 8,057,047 B2
(45) Date of Patent: Nov. 15, 2011

(54) HEAT RADIATION STRUCTURE FOR PORTABLE PROJECTOR

(75) Inventors: Yong Kwan Kim, Suwon-si (KR); Du Chang Heo, Yongin-si (KR); Jung Kee Lee, Osan-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 469 days.

(21) Appl. No.: 12/239,901

(22) Filed: Sep. 29, 2008

(65) Prior Publication Data
US 2009/0096996 A1    Apr. 16, 2009

(30) Foreign Application Priority Data
Oct. 12, 2007   (KR) .................. 10-2007-0103037

(51) Int. Cl.
*G03B 21/16* (2006.01)
*G03B 21/26* (2006.01)
*F28F 1/42* (2006.01)
*F28F 13/00* (2006.01)
*F28F 1/20* (2006.01)
*F28F 27/00* (2006.01)

(52) U.S. Cl. .............. 353/52; 353/55; 353/56; 353/122; 165/277; 165/179; 165/146; 165/181

(58) Field of Classification Search ............... 353/52, 353/122, 55, 56; 165/277, 179, 146, 181
See application file for complete search history.

(56) References Cited

U.S. PATENT DOCUMENTS

| | | | | |
|---|---|---|---|---|
| 5,842,761 | A  * | 12/1998 | Futakami et al. | 353/119 |
| 6,428,170 | B1 * | 8/2002  | Haba | 353/119 |
| 7,703,927 | B2 * | 4/2010  | Utsunomiya | 353/54 |

FOREIGN PATENT DOCUMENTS
KR    2005-029328    3/2005
* cited by examiner

*Primary Examiner* — Georgia Y Epps
*Assistant Examiner* — Magda Cruz
(74) *Attorney, Agent, or Firm* — Cha & Reiter, LLC

(57) ABSTRACT

A heat radiation structure for a portable micro projector that enables efficient radiation of heat generated therein. A projector module irradiates light of high intensity using a lamp to project an image to an external screen. A thermally conductive plate having a plate-like shape, the projector module being attached to one surface of the thermally conductive plate to transfer heat generated in the projector module. A heat radiation case to which the thermally conductive plate to which the projector module is attached is coupled therein to emit the heat transferred through the thermally conductive plate outside.

16 Claims, 4 Drawing Sheets

HEAT RADIATION STRUCTURE FOR PORTABLE PROJECTOR

CLAIM OF PRIORITY

This application claims priority under 35 U.S.C. §119 from an application entitled "HEAT RADIATION STRUCTURE FOR PORTABLE PROJECTOR" filed in the Korean Intellectual Property Office on Oct. 12, 2007 and assigned Serial No. 2007-0103037, the contents of which are incorporated herein by reference in its entirety.

BACKGROUND OF THE INVENTION

1. Field of the Invention

The present invention relates generally to a heat radiation technology. More particularly, the present invention relates to a heat radiation structure for a portable micro projector that enables efficient radiation of heat generated therein.

2. Description of the Related Art

In general, mobile communication terminals normally refer to terminals, such as personal mobile communication (PCS) terminals, personal digital assistant (PDA) terminals, international mobile telecommunication 2000 (IMT-2000) terminals, and wireless LAN terminals, which enable wireless communication and various functions using application programs while users are carrying them.

There are continuing efforts to miniaturize mobile communication terminals and for such terminals to be additionally provided with various functions of MP3s, digital cameras, navigators, and the Internet. Accordingly, mobile communication terminals are becoming complex communication terminals and necessaries of modern people.

Recently, mobile communication terminals to which micro projectors are mounted are being developed. Micro projectors ref to small-sized portable projectors that use LED modules or laser diode (LD) modules as light sources. When micro projectors are mounted to mobile communication terminals, they can be easily carried and easily project images anywhere.

There is a degree of difficulty for such a micro projector (hereinafter, referred to as 'portable projector') to radiate heat generated therein. In other words, the size of a portable projector is so small that the portable projector cannot use a heat radiation fan as in a conventional general projector.

The heat generated by a portable projector may be radiated using a Peltier device, but this method requires a supply of power. Accordingly, when a Peltier device is used in a portable projector, the power of a mobile communication terminal is easily exhausted.

SUMMARY OF THE INVENTION

The present invention provides a heat radiation structure for a portable projector that enables efficient radiation of heat generated therein.

In accordance with an exemplary embodiment of the present invention, there is provided a heat radiation structure for a portable projector including: a projector module irradiating light of high intensity using a lamp to project an image to an external screen; a thermally conductive plate having a plate-like shape, the projector module being attached to one surface of the thermally conductive plate to transfer heat generated in the projector module; and a heat radiation case to which the thermally conductive plate to which the projector module, the case being coupled therein to emit the heat transferred through the thermally conductive plate outside.

According to the present invention, a heat radiation structure for a portable projector efficiently transfers heat generated in a projector module to a heat radiation case using a thermally conductive plate. The heat transferred to the heat radiation case spreads to the entire heat radiation plate for radiation throughout. Accordingly, the heat generated in the portable projector can be efficiently radiated without requiring any separate heat radiation unit.

BRIEF DESCRIPTION OF THE DRAWINGS

The objects, features and advantages of the present invention will be more apparent from the following detailed description in conjunction with the accompanying drawings, in which.

In the accompanying drawings, some elements may be exaggerated, omitted, or schematically illustrated, and the sizes of the elements do not reflect their actual relative sizes.

DETAILED DESCRIPTION

Hereinafter, exemplary embodiments of the present invention will be described in detail with reference to the accompanying drawings.

The meaning and concept of specific terms or words used in the description and the claims should not be limited to the dictionary meanings or commonly employed sense, but should be construed in accordance with the spirit of the invention on the ground that an inventor may define suitable terms and words in order to explain his/her invention in a best mode. The description of the various exemplary embodiments is to be construed as provided for purposes of illustration and not for limitation, and the description herein does not describe every possible instance of the invention. Therefore, it should be understood that various changes may be made and equivalents may be substituted for elements of the invention that are within the spirit of the invention and the scope of the appended claims.

In the detailed description of the exemplary embodiment of the present invention, technologies that are well known in the art and are not directly relevant to the present invention may be omitted when their inclusion may obscure appreciation of the subject matter of the present invention by a person of ordinary skill. Further, a detailed description of elements having the substantially same structures and functions will not be repeated.

Figure 1:
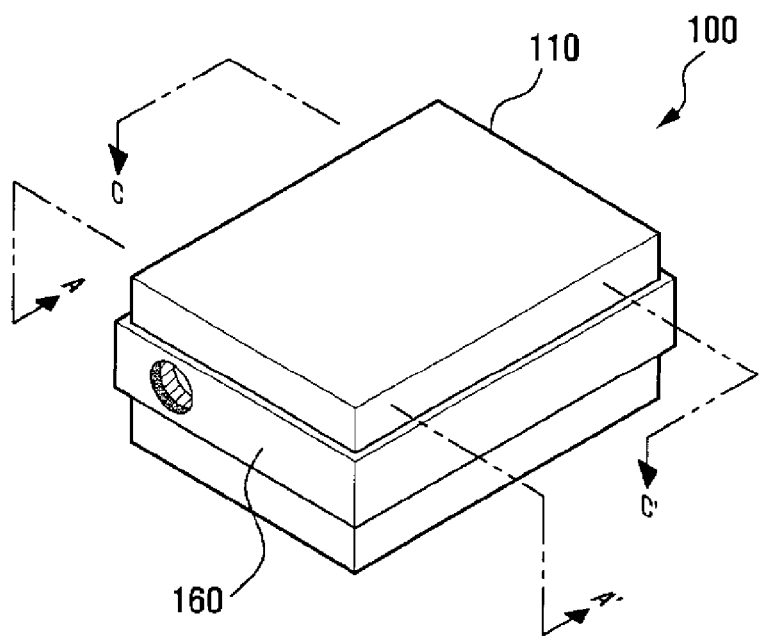
FIG. 1 is a perspective view schematically illustrating a portable projector according to an exemplary embodiment of the present invention.
Figure 2A:
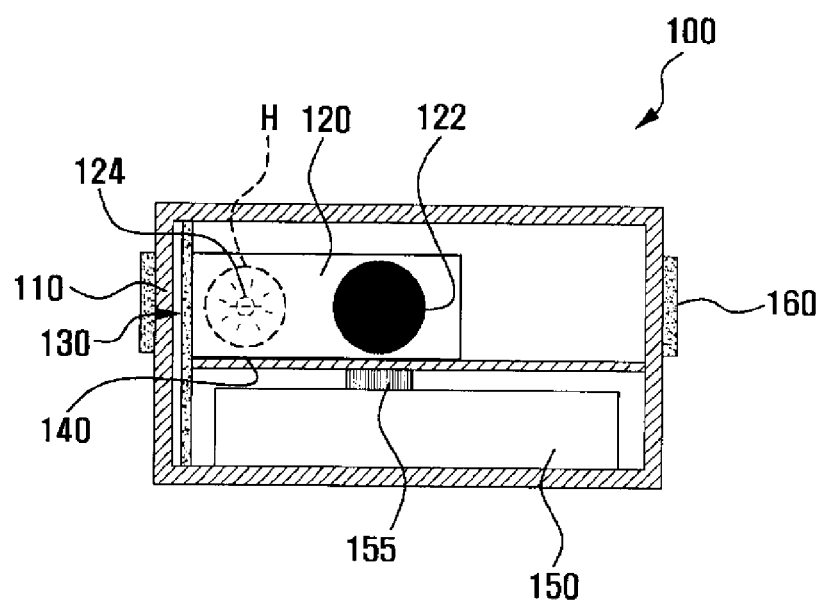
FIG. 2A is a front sectional view taken along line A-A' of FIG. 1.
Figure 2B:
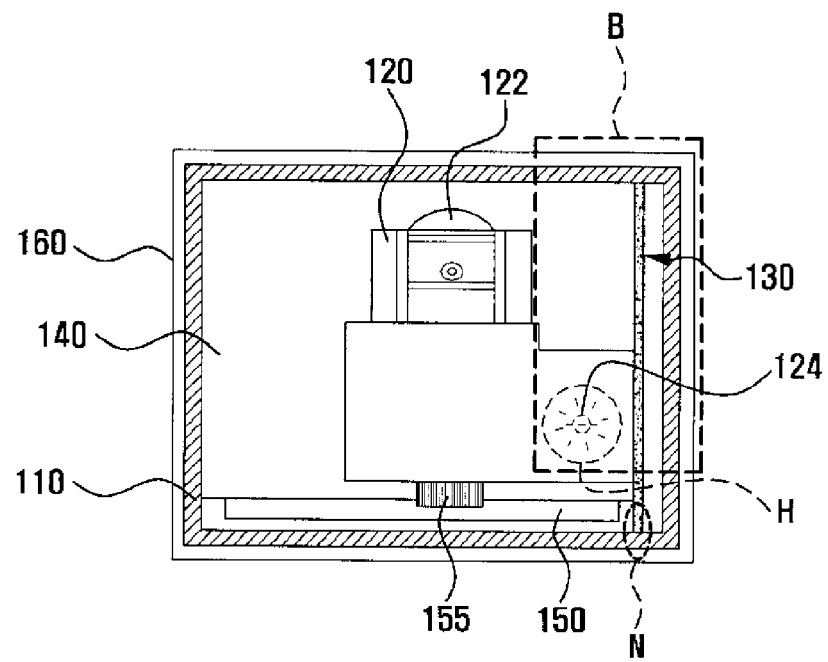
FIG. 2B is a top sectional view taken along line C-C' of FIG. 1.
Figure 3:
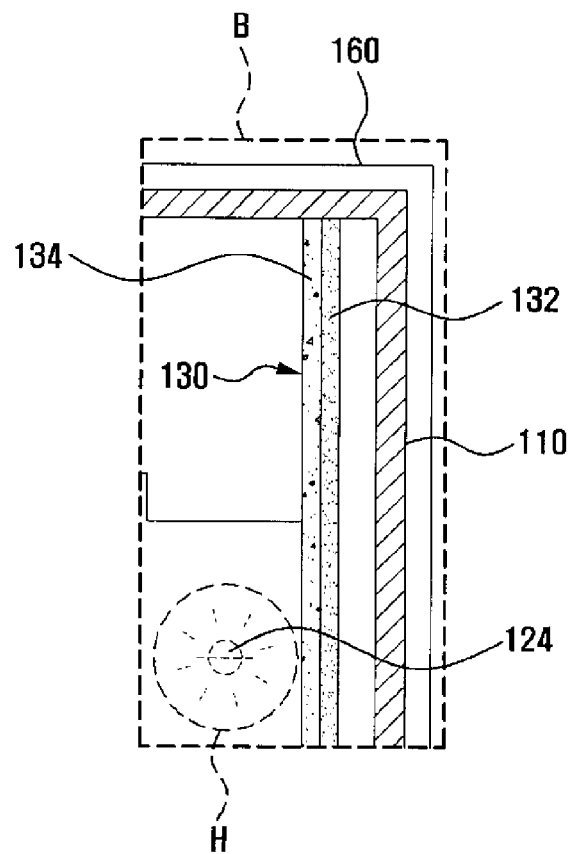
FIG. 3 is a partial sectional view of an enlarged a section B of FIG. 2B.

FIG. 1 is a perspective view schematically illustrating a portable projector according to an exemplary embodiment of the present invention. FIG. 2A is a front sectional view taken along line A-A' of FIG. 1. FIG. 2B is a top sectional view taken along line C-C' of FIG. 1. FIG. 3 is a partial sectional view obtained by enlarging a section B of FIG. 2B.

Referring to the example shown in FIGS. 1 to 3, a portable projector 100 includes a projector module 120, a circuit module 150, a positioning plate 140, a thermally conductive plate 130, a heat radiation case 110, and a protection member 160.

The projector module 120 projects, for example, still images and moving images (hereinafter, referred to 'images') produced and provided by external units such as computers or mobile communication terminals to external screens, walls, paper, and cloth. The projector module 120 includes a light source 124 for irradiating light of high luminosity, an imager (not shown) through which the light irradiated from the light source 124 passes and which projects an image, and a lens 122 enlarging the image projected through the imager and projecting the enlarged image to an external screen, a wall, paper, and cloth. In this exemplary embodiment of the present invention, the light source 124 irradiates light using a light emitting diode (LED) or a laser diode (LD). However, the light source 124 is not limited to an LED or LD, and may comprise any lamp having enough luminosity to project an image to a screen. In addition, the imager may be a liquid crystal on semiconductor (LCOS) panel, a digital light processing (DLP) panel, or a liquid crystal display (LCD) panel.

Referring now to FIG. 2A, the circuit module 150 acquires image data provided from a computer or a mobile communication terminal and transmits the acquired data to the projector module 120 through a signal line 155. Accordingly, the circuit module 150 may include a connector (not shown) connected to an external device and a power source (not shown) for supplying power to the projector module 120. The circuit module 150 may convert various image data to a projectable image signal. In the exemplary embodiment of the present invention, the circuit module 150 is located inside the portable projector 100, i.e. at a lower portion of the projector module 120, but is not limited thereto. For example, the circuit module 150 may be installed at a rear or upper portion of the projector module 120. In addition, the circuit module 150 may be arranged outside the heat radiation case 110 of the portable projector 100, and only the signal line 155 may be inserted into the heat radiation case 110 to be connected to the projector module 120. When the portable projector 100 is mounted to a mobile communication terminal (not shown), internal elements of the mobile communication terminal, such as a control unit, a signal processing unit, and a battery, may be used as the circuit module 150 of the portable projector 100.

Still referring to FIG. 2A, the positioning plate 140 is mounted within the heat radiation case 110. The projector module 120 is positioned on one surface of the positioning plate 140. Referring to FIGS. 2A and 2B, in this exemplary embodiment of the present invention, the positioning plate 140 has a plate-like shape parallel to the bottom surface of the heat radiation case 110. Both ends of the positioning plate 140 are coupled and fixed to the heat radiation case 110 and the thermally conductive plate 130 that will be described later. The projector module 120 is fixed to an upper surface of the positioning plate 140. The positioning plate 140 serves to position and fix the projector module 120, and when the thermally conductive plate 130 carries out the function of the positioning plate 140, the positioning plate 140 may be omitted.

The thermally conductive plate 130 preferably has a plate-like shape and is coupled to an interior of the heat radiation case 110. The projector module 120 is attached to one surface of the thermally conductive plate 130. In this case, one surface of the thermally conductive plate 130 is attached to the surface of the projector module that generates the most heat. The other surface of the thermally conductive plate 130 is spaced apart from one surface of the heat radiation case 110 by a predetermined interval (for example, 0.5 to 3 mm) when the thermally conductive plate 130 is coupled to the heat radiation case 110. The predetermined interval is provided because the heat (heat directly transferred from H) of the thermally conductive plate 130 is prevented from being directly transferred to one surface of the heat radiation case 110. In other words, the heat of the thermally conductive plate 130 is transferred through an air layer existing in the predetermined interval as convection heat by spacing the thermally conductive plate 130 apart from one surface of the heat radiation case 110. Accordingly, the temperature of one surface of the heat radiation case 110 relatively close to the thermally conductive plate 130 has less of a temperature increase.

In this exemplary embodiment of the present invention, the thermally conductive plate 130 may be comprised any material having a high conductivity. For example, the thermally conductive plate 130 may be made of a material such as Mg or Al, or an alloy thereof. The thermally conductive plate 130 may be made of a thermally conductive resin having a high conductivity instead of a metal.

Now referring to FIG. 3, in the exemplary embodiment of the present invention, the thermally conductive plate 130 is made of a synthetic resin 132 to which a graphite sheet 134 is attached. The synthetic resin 132 preferably comprises polycarbonate. However, the present invention is not limited thereto, and the thermally conductive plate 130 may be made of a thermally conductive resin, another synthetic resin, or other materials, such as a metal.

As illustrated in the example shown in FIG. 3, the thermally conductive plate 130 is supported by the synthetic resin 132 and the graphite sheet 134 is attached to the synthetic resin 132. The graphite sheet 134 has anisotropic characteristics that are efficient to transfer heat in the surface direction. Accordingly, in this exemplary embodiment of the present invention, the graphite sheet 134 is suitable for efficient diffusion of heat to a plate-like element such as the thermally conductive plate 130.

When the thermally conductive plate 130 includes the graphite sheet 134, one surface of the projector module 120, in particular a portion of the projector module 120 that has the highest temperature is attached to the graphite sheet 134.

As illustrated in the exemplary embodiment in FIG. 2B, the thermally conductive plate 130 is perpendicular to the positioning plate 140 when it is coupled to the positioning plate 140. It is because a portion of the projector module 120 that generates heat most is a side surface H of the projector module 120, but the present invention is not limited thereto. In general, a portion of the projector module 120 where a lamp (i.e. a light source) is installed has the highest temperature. Accordingly, a portion of the thermally conductive plate 130 that makes contact with the projector module 120 may become different in correspondence to the position of the lamp of the projector module 120. For example, when the lamp is close to the bottom surface of the projector module 120, the thermally conductive plate 130 is preferably installed instead of the positioning plate 140 of FIG. 2B. In this case, the positioning plate 140 is omitted and the thermally conductive plate 130 may carry out the function of the positioning plate 140.

The heat radiation case 110 forms the outer shape of the portable projector 100 and protects elements installed therein. In addition, in the embodiment of the present invention, the heat radiation case 110 emits heat transferred through the thermally conductive plate 130 outside. To achieve this, the heat radiation case 110 is made of a material of high thermal conductivity. In other words, the heat radiation case 110 may be made of a material selected from a metal, alloy steel, and a thermally conductive resin. In addition, the heat radiation case 110 may include a graphite sheet like the thermally conductive plate 130. In this particular case, it is preferable that the graphite sheet is provided on the inner wall of the heat radiation case 110 and the outer wall thereof is made of a metal, an alloy, or a thermally conductive resin.

As mentioned above, in this exemplary embodiment of the present invention, the portable projector 100 radiates heat generated in the projector module 120 outside through a case of high thermal conductivity. Accordingly, the volume of the portable projector 100 can be reduced and heat can be efficiently radiated as compared with a conventional portable projector using a heat radiation fan or a heat sink.

According to the present invention, when heat is concentrated at a portion of the heat radiation case 110 and increases the temperature of the heat radiation case 110, the protection member 160 prevents a user from being burned or otherwise alarmed. Even when heat is radiated through the thermally conductive plate 130 and the heat radiation case 110 in the portable projector 100 due to the structure illustrated in FIG. 2B, a specific region (for example, N) may have a high temperature (refer to FIGS. 4 and 5). Accordingly, in this exemplary embodiment of the present invention, when a specific portion of the portable projector 100 has an intensively high temperature, the protection member 160 is used to protect a user.

The protection member 160 covers a portion of the heat radiation case 110 that has the highest temperature due to the projector module 120 and is coupled to the heat radiation case 110. In FIGS. 1 to 3, the protection member 160 is band-shaped and wraps the heat radiation case 110 when the protection member is coupled to the heat radiation case 110. Accordingly, a user is prevented from making contact with a portion of the heat radiation case 110 of the highest temperature and possibly being burned or otherwise made uncomfortable.

As shown in FIGS. 2B and 3, the protection member 160 is preferably made of a material having a thermal conductivity of below 1 W/mK and is preferably made of a synthetic resin or a rubber.

In the exemplary embodiment of the present invention, the protection member is band-shaped, but the invention is not limited to such as shape. In other words, the protection member 160 may cover one surface of the heat radiation case 110 entirely or may cover a portion of the heat radiation case 110 where heat is concentrated.

Hereinafter, the operation of a portable projector 100 according to this exemplary embodiment of the present invention will be described in detail.

If a user drives the portable projector 100, the circuit module 150 converts image data transmitted from an external device to a projectable image signal and transmits the image signal to the projector module 120. The projector module 120 projects an image using the light emitted from a light source. During the process, the heat generated in the light source is transferred to the thermally conductive plate 130. The thermally conductive plate diffuses the transferred heat to transfer the heat to the heat radiation case 110. Then, the heat of the thermally conductive plate 130 is transferred through the thermally conductive plate 130 and the heat radiation case 110 and is radiated to one surface of the heat radiation case 110 through the other surface of the thermally conductive plate 130.

The heat transferred to the heat radiation case 110 propagates to the entire heat radiation case 110 and, at the same time, is radiated outside the heat radiation case 110. During the process, the heat generated in the portable projector 100 is continuously radiated outside.

Figure 4:
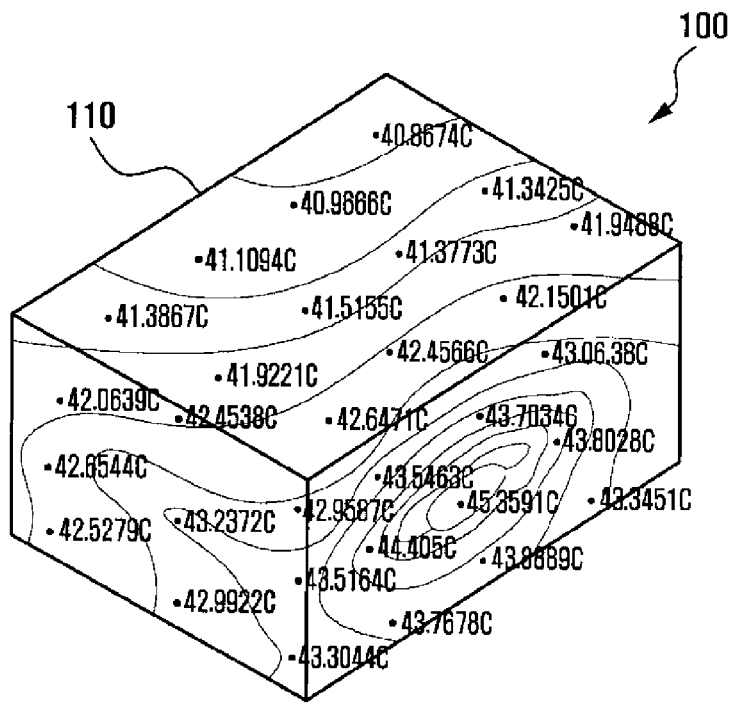
FIG. 4 is a view illustrating the temperature distribution in a heat radiation case without a thermally conductive plate according to the exemplary embodiment of the present invention.
Figure 5:
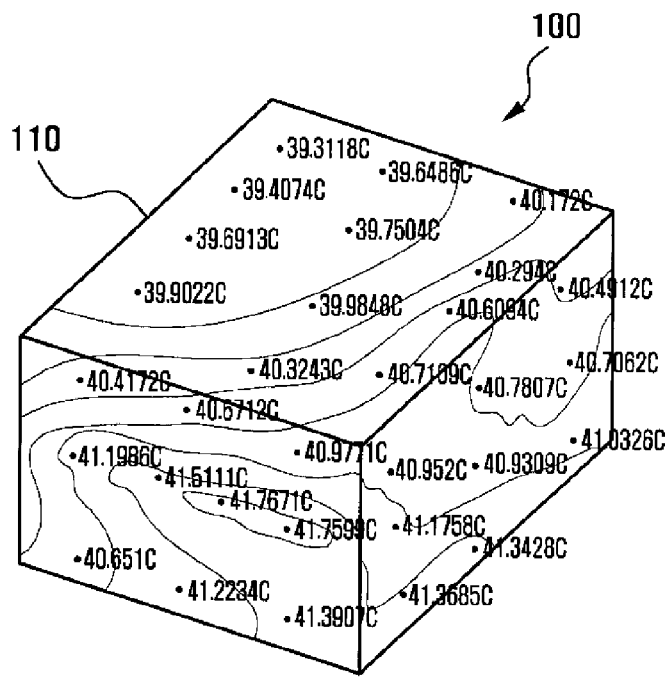
FIG. 5 is a view illustrating the temperature distribution in a heat radiation case having a thermally conductive plate according to the exemplary embodiment of the present invention.
Figure 6:
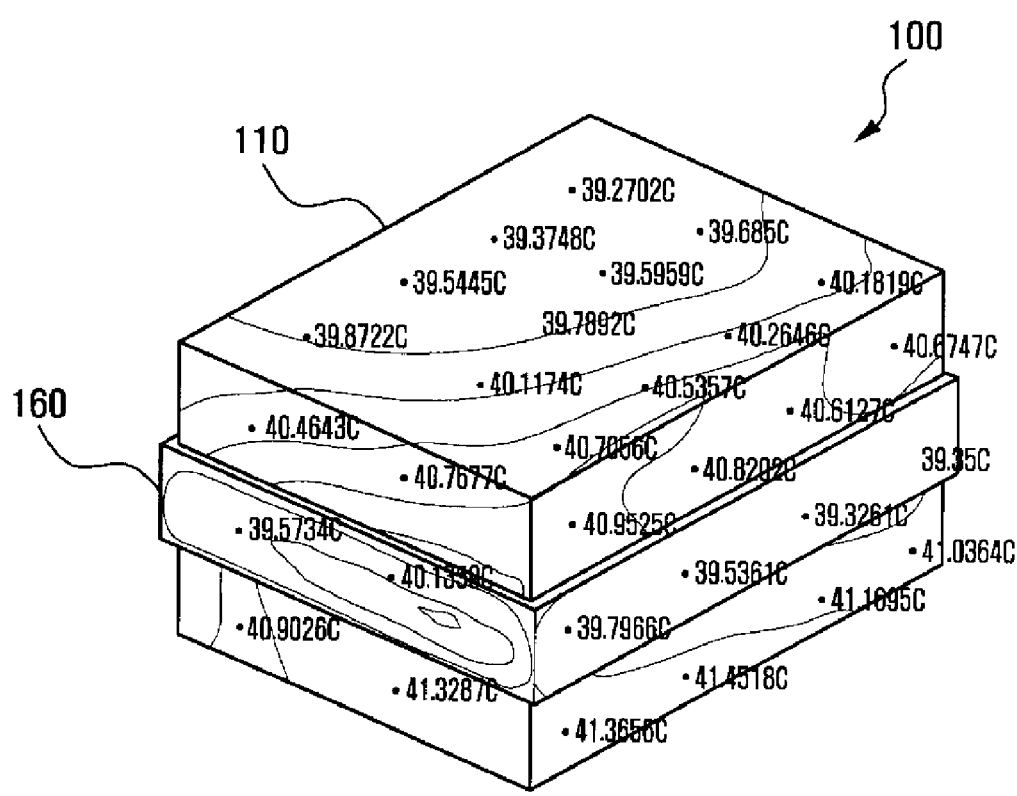
FIG. 6 is a view illustrating the temperature distribution in a heat radiation case having a protection member according to the exemplary embodiment of the present invention.

The heat radiation state of the portable projector 100 according to the exemplary embodiment of the present invention is illustrated in FIGS. 4 to 6.

FIG. 4 is a view illustrating the temperature distribution in a heat radiation case without a thermally conductive plate according to the exemplary embodiment of the present invention. FIG. 5 is a view illustrating the temperature distribution in a heat radiation case having a thermally conductive plate according to the exemplary embodiment. FIG. 6 is a view illustrating the temperature distribution in a heat radiation case having a protection member according to the embodiment of the present invention.

FIGS. 4 to 6 illustrate a simulation result created by the portable projector according to the exemplary embodiment of the present invention. Referring to FIG. 4, the temperature of a heat concentrated portion increases up to approximately 46 degrees Celsius. However, when the thermally conductive plate 130 is installed as in FIG. 5, it can be seen that the heat concentrated portion of FIG. 4 is eliminated and the maximum temperature is approximately 42 degrees Celsius. When the protection member 160 is installed as in FIG. 6, the temperature of the protection member 160 is maintained at approximately 40 degrees Celsius. In the exemplary embodiment of the present invention, the thermally conductive plate 130 and the protection member 160 restrain heat from being concentrated at one location.

When the portable projector 100 is mounted to a mobile communication terminal, the heat radiation case 110 preferably uses an outer case of the mobile communication terminal. In other words, the outer case of the mobile communication terminal preferably has a form of a heat radiation case of high thermal conductivity, and the thermally conductive plate 130 transfers the heat generated in the projector module 120 to the outer case of the mobile communication terminal. In this case, since heat is radiated through the outer case of the mobile communication terminal that has a relatively large volume, a higher heat radiation effect can be achieved as compared in the case of using only the heat radiation case 110 of the portable projector 100.

The heat radiation structure of the present invention is not limited to the exemplary embodiments shown and described herein, and many variations and modifications may be made by those skilled in the art within the spirit of the present invention and the scope of the appended claims. For example, it is preferred that in the present invention an air layer is provided between one surface of a thermally conductive plate and the heat radiation case, but the present invention is not limited thereto and various materials may be filled therebetween to control the thermal conductivity.

Furthermore, it is preferable that a material for activating heat radiation is coated on a surface of the heat radiation case to increase the radiation efficiency of heat. In addition, in the exemplary embodiment of the present invention, the portable projector is mounted to a mobile communication terminal, but may be applied to various electronic appliances capable of providing images.

What is claimed is:

1. A heat radiation structure for a portable projector comprising:
   a projector module, including a lamp for irradiating high intensity light for projecting an image;
   a thermally conductive plate member being plate-shaped, the projector module being attached to one surface of the thermally conductive plate for transferring heat generated in the projector module, wherein one surface of the thermally conductive plate is attached to a portion of the projector module that is closest to the lamp; and
   a heat radiation case having the thermally conductive plate coupled thereto for emitting heat transferred through the thermally conductive plate to an exterior.

2. The heat radiation structure of claim 1, wherein the heat radiation case is selected from the group consisting of a metal, an alloy steel, and a thermally conductive resin having a high thermal conductivity.

3. The heat radiation structure of claim 2, further comprising a graphite sheet being attached to an inner wall of the heat radiation case.

4. The heat radiation structure of claim 1, wherein another surface of the thermally conductive plate is spaced apart from a surface of the heat radiation case when the thermally conductive plate is coupled to the heat radiation case.

5. The heat radiation structure of claim 4, wherein the thermally conductive plate is selected from the group consisting of a metal, an alloy steel, and a thermally conductive resin having a high thermal conductivity.

6. The heat radiation structure of claim 4, wherein the thermally conductive plate comprises a synthetic resin having a graphite sheet attached thereto.

7. The heat radiation structure of claim 6, wherein the synthetic resin comprises polycarbonate.

8. The heat radiation structure of claim 6, wherein the projector module is attached to the graphite sheet.

9. The heat radiation structure of claim 1, wherein the lamp employs one of a light emitting diode (LED) or a laser diode (LD).

10. The heat radiation structure of claim 1, further comprising a protection member coupled to the heat radiation case for covering a surface portion of the heat radiation case that has the highest temperature.

11. The heat radiation structure of claim 10, wherein the protection member is band-shaped and wraps the heat radiation case when coupled to the heat radiation case.

12. The heat radiation structure of claim 10, wherein the protection member has a thermal conductivity of below 1 W/mK.

13. The heat radiation structure of claim 10, wherein the protection member is made of at least one of a synthetic resin and a rubber.

14. The heat radiation structure of claim 1, further comprising a positioning plate mounted in an interior of the heat radiation case, on which the projector module is positioned.

15. The heat radiation structure of claim 14, wherein one end of the positioning plate is coupled to one surface of the thermally conductive plate.

16. The heat radiation structure of claim 1, further comprising a circuit module for converting image data to a projectable image signal, said circuit module arranged inside the portable projector at a portion of the projector module.

* * * * *